Aug. 2, 1927.
G. R. LIVERGOOD
DRILL STEM CLAMP
Filed April 17, 1924
1,637,383
2 Sheets-Sheet 1
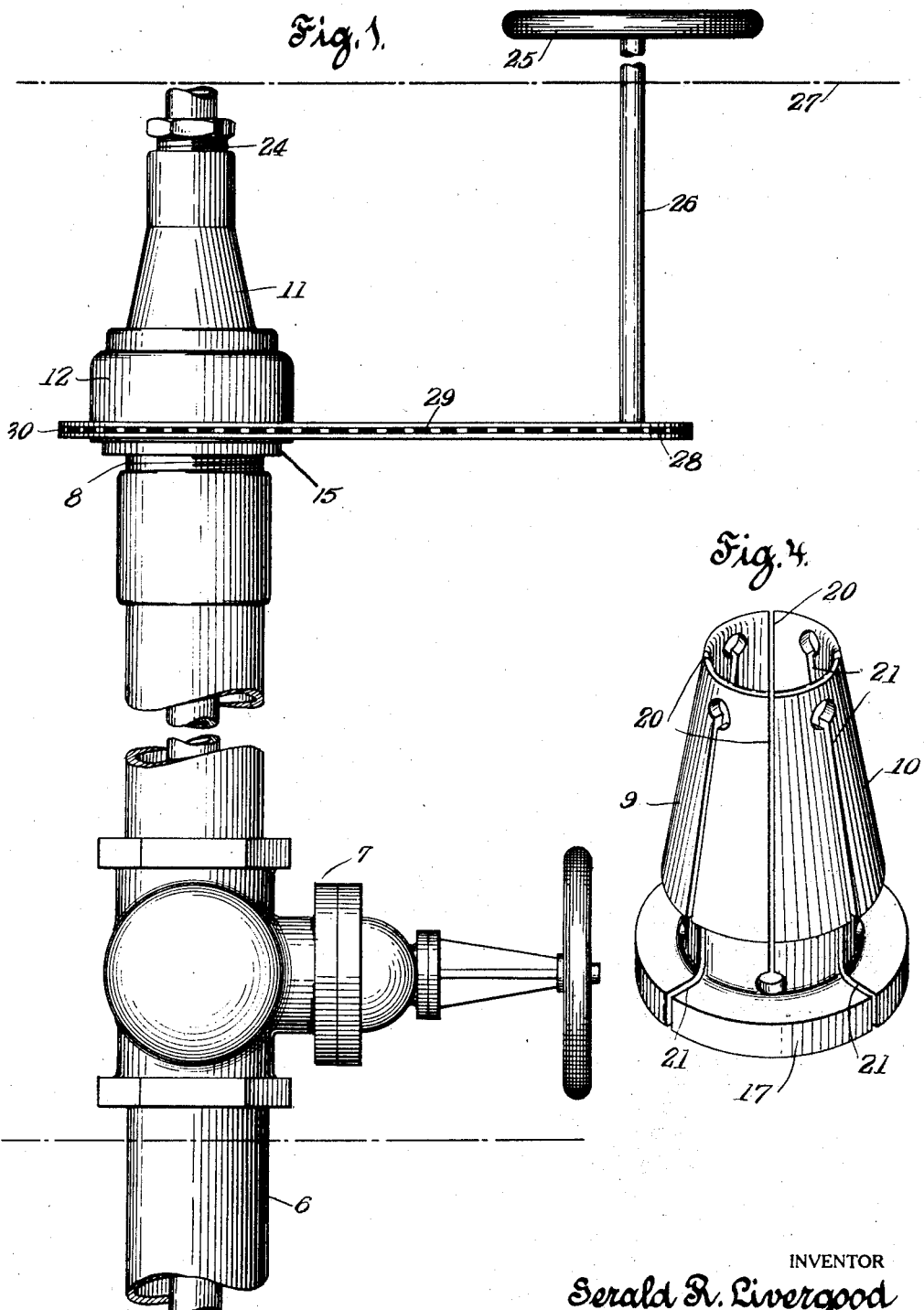
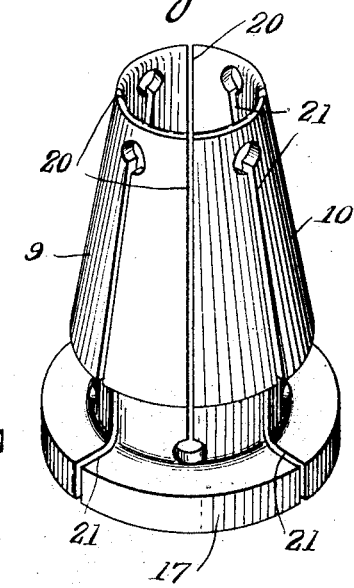
INVENTOR
Gerald R. Livergood
BY
Philip S. McLean ATTORNEY Aug. 2, 1927.
G. R. LIVERGOOD
1,637,383
DRILL STEM CLAMP
Filed April 17, 1924
2 Sheets-Sheet 2
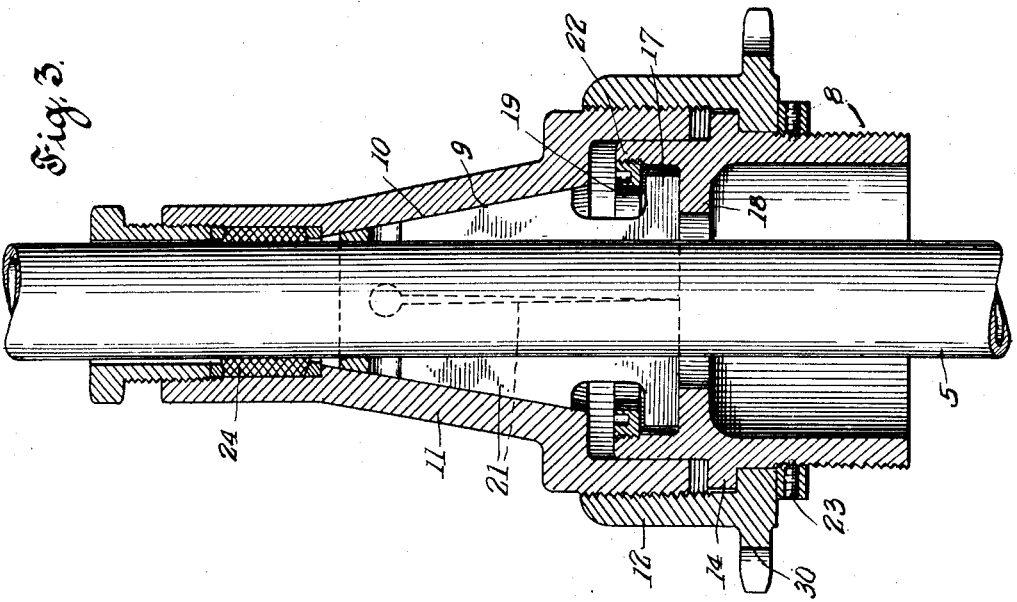
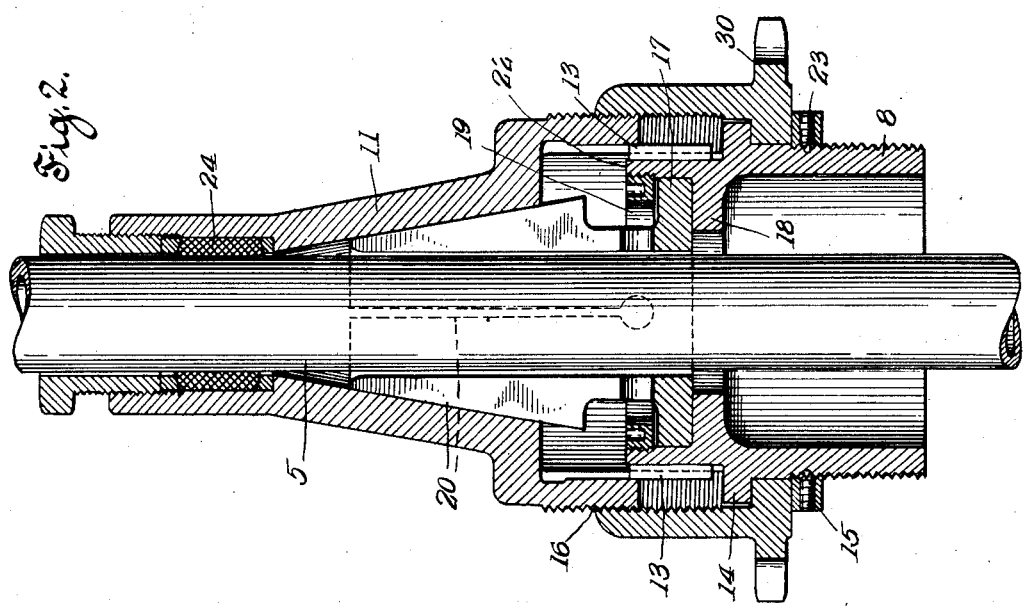
INVENTOR
Gerald R. Livergood
BY
Philip S. McLean ATTORNEY Patented Aug. 2, 1927.

1,637,383

UNITED STATES PATENT OFFICE.

GERALD R. LIVERGOOD, OF HOUSTON, TEXAS.

DRILL-STEM CLAMP.

Application filed April 17, 1924. Serial No. 707,081.

The objects of this invention are to provide simple, effective and powerful yet easily controlled means for holding the drill stem of a well drilling outfit and particularly for gripping the stem with a regulatable braking force when the tools are being removed after pressure has been encountered in a well.

These objects are attained in part by a novel clamp construction in the nature of a collet chuck through which the drill stem passes and which has a readily accessible control enabling quick application of any desired degree of holding force to the drill stem.

Various other novel features of the invention will appear as the specification proceeds.

In the drawings accompanying and forming part of the specification, a simple, practical embodiment of the invention is illustrated, but it is to be understood that the structure may be modified in various ways without departure from the broad spirit and scope of the invention as hereinafter defined and claimed.

Figure 1 is a broken side elevation of the invention as in actual use.

Figures 2 and 3 are vertical sectional views showing first the chuck open and free of holding engagement with the drill stem and then partly closed in frictional engagement with the stem.

Figure 4 is a detail perspective view of the compressible chuck or clamp body.

In the illustration a section of drill stem is indicated at 5 and a part of the well casing at 6, the latter being shown equipped with a shut-off valve 7 and other usual fittings.

Applied to the head of the casing there is shown a housing 8 for supporting and enclosing the clamp sleeve 9, which is constructed after the manner of a spring collet. This sleeve surrounds the drill stem and is made with an external bevel or taper 10, acted on by a correspondingly internally tapered contracting sleeve 11, engaged by a screw ring 12.

The contracting sleeve is keyed to the housing at 13 so as to be capable only of a straight sliding movement and the screw ring is rotatably supported between annular shoulders 14, 15, so that rotation of the screw ring through the screw connection at 16, between these parts has the effect of positively shifting the contracting ring upwardly or downwardly over the clamp sleeve.

The clamp sleeve is shown provided at its lower end with a flange 17 loosely confined between annular shoulders 18, 19, and which serve as retainers to hold said sleeve while the contracting sleeve is being shifted thereover.

The normal internal diameter or bore of the clamp sleeve is usually slightly greater than the diameter of the drill stem so that in its expanded or uncompressed condition it will stand in the clear and permit the stem to operate freely therethrough.

The full length of the clamp is made effective for holding purposes in the present disclosure by slotting the same alternately from opposite ends, as indicated at 20, 21, providing thereby a series of clamp segments connected in alternation at opposite ends of the sleeve so that they may approach and separate substantially the same throughout their length.

The positioning shoulders 18, 19 for the spring collet are shown provided, the first by an integral inwardly extending flange inside the housing 8 forming a seat on which the collet rests, and the second in the form of a screw ring turned down into a screw seat provided in the upwardly projecting annular extension 22 of the housing. This annular wall also operates as a means for centering the lower end of the contracting sleeve which is shown in Figure 3 as having a sliding fit over the same.

In somewhat similar fashion the shoulders 14, 15 for the screw ring are formed respectively by an integral external annular flange on the housing and a screw ring turned up over the lower screw threaded end of the housing. The screw rings may be secured in adjusted position by means of suitable lock screws or the like such as indicated at 23. The constructions just described are particularly advantageous in enabling quick and easy assemblage, disassemblage or adjustment of the parts. Thus in case of breakage or wearing out of the spring collet, the parts may be readily disconnected to enable replacement of the collet or other part.

The collet contracting sleeve may be equipped with a suitable stuffing box on the order of that illustrated at 24 to preserve the continuity of the well casing.

In order that the clamp may be instantly operated from the derrick floor or quickly adjusted when occasion requires, there is shown in Figure 1 means for actuating the same in the form of a hand wheel 25 carried by a spindle 26 projecting up through the derrick floor, indicated at 27, said spindle carrying at its lower end a pinion 28 with which is engaged a sprocket chain 29 operating on the teeth of a sprocket extension 30 on the screw ring 12.

The hand wheel 25 being located at some convenient point within easy reach of the operator, it will be seen that the clamp may be instantly engaged with or disengaged from the drill stem and the braking effect thereon be varied to take care of any conditions that may be encountered. By gearing down the movement of the screw ring in the manner indicated, a very fine and accurate control can be exercised over the clamp and the parts will remain in the positions adjusted until further change is required.

What is claimed is:

1. In well drilling apparatus of the rotary type, the combination with the rotary drill pipe and the surrounding stationary casing, of a support applicable to the casing and provided with horizontal shoulders spaced one above the other, a clamp sleeve having an outstanding flange confined between said shoulders and a compressible conical gripping portion surrounding the pipe and expansible when relieved of pressure to permit the pipe to rotate freely therein, a contracting sleeve surrounding the conical portion of the clamp sleeve, said contracting sleeve being guided by the stationary support for movement over the clamp sleeve and adapted to be supported by said stationary support in position to leave the clamp sleeve free of the rotating pipe and means for shifting the contracting sleeve with respect to the support and the stationary casing to cause the clamp sleeve to engage with and act as a brake on the pipe.

2. A structure as in claim 1 in which a stuffing box is carried by the contracting sleeve for making a tight joint with the pipe.

3. A structure as in claim 1 in which the contracting sleeve is keyed to slide over the support on the stationary casing and in which the shifting means is an annular member confined on the support and having a screw connection with the slidingly guided contracting sleeve.

4. In well drilling apparatus, a drill stem engaging collet, means for supporting the same in position surrounding the drill stem, a sleeve for compressing the collet, means for guiding said sleeve and for supporting the same against rotative movement and a rotatable ring having a screw engagement with said sleeve and confined against longitudinal movement to thereby effect a shifting movement of the sleeve over the collet.

5. In well drilling apparatus, a drill stem engaging collet, means for supporting the same in position surrounding the drill stem, a sleeve for compressing the collet, means for guiding said sleeve and for supporting the same against rotative movement and a rotatable ring having a screw engagement with said sleeve and confined against longitudinal movement to thereby effect a shifting movement of the sleeve over the collet and driving means for rotating the screw ring.

6. In well drilling apparatus, a housing having an internal shoulder, an annular extension projecting above the same, a collet seated on said shoulder and provided with a flange, a confining ring engaged with the annular extension over the flange of the collet, a sleeve slidingly keyed on the housing and guided over the annular extension, an external shoulder on the housing and a screw ring engaged with said external shoulder and having a screw threaded connection with the sleeve.

7. In well drilling apparatus, a housing having an internal shoulder, an annular extension projecting above the same, a collet seated on said shoulder and provided with a flange, a confining ring engaged with the annular extension over the flange of the collet, a sleeve slidingly keyed on the housing and guided over the annular extension, an external shoulder on the housing, a screw ring engaged with said external shoulder and having a screw threaded connection with the sleeve, the housing having a screw threaded lower end for connection with a well casing and a positioning ring engaged over the screw threaded end portion of the housing to take the thrust of the screw ring away from said external shoulder.

8. In well drilling apparatus, a housing having an internal shoulder, an annular extension projecting above the same, a collet seated on said shoulder and provided with a flange, a confining ring engaged with the annular extension over the flange of the collet, a sleeve slidingly keyed on the housing and guided over the annular extension, an external shoulder on the housing and a screw ring engaged with said external shoulder and having a screw threaded connection with the sleeve, said screw ring having gear teeth for operation of the same.

9. In well drilling apparatus, the combination with a drill pipe and stationary casing surrounding the same, of a brake for controlling the withdrawal of the drill pipe under pressure, comprising a compressible split spring collet surrounding the drill pipe but of larger diameter than the drill pipe so as not to interfere with the free rotation of the pipe during drilling operations, a stationary support for the collet mounted on said stationary drill casing, said collet being of tapered conical form and supported with the tapered end of the same faced upwardly, a compressing sleeve covering the tapered portion of the collet and means on the stationary support for forcing said sleeve downwardly over the tapered portion of the collet to compress the same to a variable extent upon the drill pipe.

In witness whereof, I have hereunto set my hand this 21st day of March, 1924.

GERALD R. LIVERGOOD.